US012668181B2

(12) United States Patent
Matsumoto

(10) Patent No.: US 12,668,181 B2
(45) Date of Patent: Jun. 30, 2026

(54) DRIVING ASSISTANCE APPARATUS

(71) Applicant: TOYOTA JIDOSHA KABUSHIKI KAISHA, Toyota (JP)

(72) Inventor: Ryo Matsumoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 18/904,638

(22) Filed: Oct. 2, 2024

(65) Prior Publication Data

US 2025/0170956 A1     May 29, 2025

(30) Foreign Application Priority Data

Nov. 24, 2023     (JP) ................................. 2023-198870

(51) Int. Cl.
    B60Q 9/00        (2006.01)
    G08G 1/16        (2006.01)
(52) U.S. Cl.
    CPC .............. B60Q 9/00 (2013.01); G08G 1/166 (2013.01)
(58) Field of Classification Search
    CPC ........ G08G 1/166; G08G 1/167; G08G 1/163; B60Q 9/00; B60W 30/0956; B60W 50/14; B60W 2050/143; B60W 30/18163; B60W 40/02; B60R 1/002
    See application file for complete search history.

(56) References Cited

U.S. PATENT DOCUMENTS

| | | | | |
|---|---|---|---|---|
| 9,235,767 | B2 * | 1/2016 | Fukata | ................... G08G 1/167 |
| 11,142,191 | B2 * | 10/2021 | Takasao | ............... B60W 10/18 |
| 2013/0268186 | A1 * | 10/2013 | Yamashiro | ............. G08G 1/163 |
| | | | | 701/300 |
| 2018/0086338 | A1 * | 3/2018 | Yamada | .......... B60W 30/18163 |
| 2018/0178802 | A1 * | 6/2018 | Miyata | ............... B60W 30/095 |
| 2020/0369281 | A1 * | 11/2020 | Sato | ................. B60W 30/0956 |
| 2021/0188260 | A1 * | 6/2021 | Jung | ..................... B60W 30/09 |
| 2021/0394754 | A1 * | 12/2021 | Takahashi | ............... G08G 1/16 |
| 2023/0331231 | A1 * | 10/2023 | Mujumdar | .......... B60W 50/085 |
| 2024/0409097 | A1 * | 12/2024 | Shimizu | ............... B60W 60/00 |

FOREIGN PATENT DOCUMENTS

| | | | |
|---|---|---|---|
| JP | H06-258426 A | 9/1994 | |
| JP | 2002-372584 A | 12/2002 | |
| JP | 2011141746 A | * | 7/2011 |

\* cited by examiner

*Primary Examiner* — Adnan Aziz
(74) *Attorney, Agent, or Firm* — Sughrue Mion, PLLC

(57)             ABSTRACT

A driving assistance apparatus includes an on-board sensor, and a processor. The processor sets the lateral distance between a first long side and the own vehicle to a first predetermined value, and sets the lateral distance between a second long side and the own vehicle to a second predetermined value, when the own vehicle is traveling in the central part of a first lane in the width direction of the first lane, and sets the lateral distance between the first long side and the own vehicle to the first predetermined value, and sets the lateral distance between the second long side and the own vehicle to a value smaller than the second predetermined value, when the own vehicle is displaced toward a second lane adjacent to the first lane from the central part of the first lane in the width direction of the first lane.

20 Claims, 6 Drawing Sheets

DRIVING ASSISTANCE APPARATUS

CROSS-REFERENCE TO RELATED APPLICATION

This application claims priority to Japanese Patent Application No. 2023-198870 filed on Nov. 24, 2023, incorporated herein by reference in its entirety.

BACKGROUND

1. Technical Field

The disclosure relates to a driving assistance apparatus that issues an alarm to a driver of an own vehicle when a three-dimensional object is present within a predetermined area diagonally behind the own vehicle.

2. Description of Related Art

A driving assistance apparatus that issues an alarm to a driver of an own vehicle when a three-dimensional object is present within a predetermined area diagonally behind the own vehicle has been proposed (e.g., refer to Japanese Unexamined Patent Application Publication No. 6-258426 described below). The driving assistance apparatus (hereinbelow, referred to as the "conventional apparatus") emits radio waves to the rear of the own vehicle (diagonally rearward right and diagonally rearward left). When a three-dimensional object is present diagonally behind the own vehicle, the radio waves emitted from the conventional apparatus is reflected by the three-dimensional object, and the radio waves (reflected waves) travel toward the own vehicle. The conventional apparatus receives the reflected waves. The conventional apparatus calculates physical quantities related to the three-dimensional object (such as the position of the three-dimensional object relative to the own vehicle and the speed of the three-dimensional object relative to the own vehicle) based on the physical quantities related to the emitted radio waves and the received reflected waves. When the conventional apparatus determines that the three-dimensional object is approaching the own vehicle based on the calculation result, the conventional apparatus issues a predetermined alarm to the driver.

SUMMARY

As described above, the conventional apparatus emits the radio waves for detecting a three-dimensional object to the rear of the own vehicle. In the conventional apparatus, a reachable area of the emitted radio waves (the radius of a fan-shaped area extending diagonally rearward of the own vehicle (a reachable distance of the radio waves)) corresponds to a target area for issuing the alarm (hereinbelow, referred to as the "alarm target area"). Typically, the reachable distance of the radio waves is larger than the width of a standard travel lane (3.5 meters). For example, the reachable distance of the radio waves is approximately 10 meters.

For example, when the own vehicle is traveling in a first lane of a road including the first lane (left lane), a second lane (center lane), and a third lane (right lane), the radio waves emitted diagonally rearward right from the own vehicle reach at least the vicinity of the border between the second lane and the third lane. That is, in plan view, the alarm target area overlaps the second lane.

For example, when the driver moves the own vehicle from the first lane to the second lane (lane change) in order to overtake a vehicle ahead, a scene in which another vehicle is present within an area overlapping the second lane in the alarm target area is assumed. In the scene, the conventional apparatus detects the other vehicle and issues an alarm. This enables the driver to cancel (or postpone) the lane change in order to avoid contact between the other vehicle and the own vehicle.

On the other hand, when there is no other vehicle in the second lane, no alarm is issued. Thus, when the driver starts to move the own vehicle toward the second lane, the alarm target area also makes a parallel movement to the right along with the movement (lateral displacement) of the own vehicle. In the process, an end part of the alarm target area may overlap the third lane. A scene in which another vehicle is present within the end part of the alarm target area (within the area overlapping the third lane) is assumed. In the scene, the conventional apparatus detects the other vehicle and issues an alarm. In the scene, the other vehicle is unlikely to interfere with the movement (lane change) of the own vehicle from the first lane to the second lane. Nevertheless, the conventional apparatus issues an alarm. Thus, the driver of the own vehicle may feel annoyed by the alarm.

One object of the present disclosure is to provide a driving assistance apparatus that issues an alarm when a three-dimensional object is present diagonally behind an own vehicle and can reduce originally unnecessary alarms.

In order to solve the above problem, a driving assistance apparatus (1) of the present disclosure includes an on-board sensor (20) that obtains information about a target present around an own vehicle (V), and a processor (10) that controls a notification device (30) such that an alarm is issued when a three-dimensional object is present within an alarm target area (Aa, Ab) having a band shape extending in the front-rear direction at a position diagonally behind the own vehicle.

The processor is configured to set the lateral distance (D3a, D3b) between a first long side (E3a, E3b) and the own vehicle to a first predetermined value ($\Delta$d3), the first long side being a long side of the alarm target area and located on the own vehicle side, and set the lateral distance (D4a, D4b) between a second long side (E4a, E4b) and the own vehicle to a second predetermined value ($\Delta$d4 [0]), the second long side being a long side of the alarm target area and located on the opposite side of the own vehicle, when the own vehicle is traveling in the central part of a first lane (L1) in the width direction of the first lane, and set the lateral distance between the first long side and the own vehicle to the first predetermined value, and set the lateral distance between the second long side and the own vehicle to a value ($\Delta$d4 [$\Delta$Ya], $\Delta$d4 [$\Delta$Yb]) smaller than the second predetermined value, when the own vehicle is displaced toward a second lane (L2a, L2b) adjacent to the first lane from the central part of the first lane in the width direction of the first lane.

A driving assistance method according to the present disclosure includes obtaining information about a target present around an own vehicle, and controlling a notification device such that an alarm is issued when a three-dimensional object is present within an alarm target area having a band shape extending in the front-rear direction at a position diagonally behind the own vehicle.

The controlling is configured to include setting the lateral distance between a first long side and the own vehicle to a first predetermined value, the first long side being a long side of the alarm target area and located on the own vehicle side, and setting the lateral distance between a second long side and the own vehicle to a second predetermined value, the second long side being a long side of the alarm target area and located on the opposite side of the own vehicle, when the own vehicle is traveling in the central part of a first lane in the width direction of the first lane, and setting the lateral distance between the first long side and the own vehicle to the first predetermined value, and setting the lateral distance between the second long side and the own vehicle to a value smaller than the second predetermined value, when the own vehicle is displaced toward a second lane adjacent to the first lane from the central part of the first lane in the width direction of the first lane.

A storage medium according to the present disclosure stores a driving assistance program that causes a computer included in an own vehicle to execute obtaining information about a target present around the own vehicle, and controlling a notification device such that an alarm is issued when a three-dimensional object is present within an alarm target area having a band shape extending in the front-rear direction at a position diagonally behind the own vehicle. (US)

A driving assistance program according to the present disclosure causes a computer included in an own vehicle to execute obtaining information about a target present around the own vehicle, and controlling a notification device such that an alarm is issued when a three-dimensional object is present within an alarm target area having a band shape extending in the front-rear direction at a position diagonally behind the own vehicle. (CN)

The controlling is configured to include setting the lateral distance between a first long side and the own vehicle to a first predetermined value, the first long side being a long side of the alarm target area and located on the own vehicle side, and setting the lateral distance between a second long side and the own vehicle to a second predetermined value, the second long side being a long side of the alarm target area and located on the opposite side of the own vehicle, when the own vehicle is traveling in the central part of a first lane in the width direction of the first lane, and setting the lateral distance between the first long side and the own vehicle to the first predetermined value, and setting the lateral distance between the second long side and the own vehicle to a value smaller than the second predetermined value, when the own vehicle is displaced toward a second lane adjacent to the first lane from the central part of the first lane in the width direction of the first lane.

When the own vehicle to which the conventional apparatus is applied is displaced in the lateral direction, the alarm target area is displaced in the lateral direction (parallelly moved) as with the displacement of the own vehicle with the size of the alarm target area remaining unchanged. Thus, a part of the alarm target area may protrude toward the third lane (the lane on the opposite side of the first lane) adjacent to the second lane. As the lateral displacement amount of the own vehicle increases, the amount of protrusion of the alarm target area to the third lane (the width of the part overlapping the third lane) increases.

On the other hand, in the driving assistance apparatus according to the present disclosure, when the own vehicle is displaced in the lateral direction from the central part of the first lane in the width direction (lateral direction) of the first lane (hereinbelow, referred to as the "neutral position"), while the lateral distance between the own vehicle and the first long side is maintained constant, the lateral distance between the own vehicle and the second long side is shortened. That is, the width (the lateral size) of the alarm target area is reduced. Thus, when the own vehicle is displaced in the lateral direction from the neutral position, protrusion of the alarm target area toward the third lane (or increase in the amount of protrusion) is restrained. As a result, issuance of originally unnecessary alarms is reduced.

In the driving assistance apparatus according to an aspect of the present disclosure, the processor may obtain a lateral displacement amount when the own vehicle is displaced toward the second lane from the central part of the first lane in the width direction of the first lane, and set the lateral distance between the second long side and the own vehicle to a value obtained by subtracting the lateral displacement amount from the second predetermined value.

According to this, even when the own vehicle is displaced in the lateral direction from the neutral position, the position of the second long side relative to the road surface remains unchanged.

In the driving assistance apparatus according to another aspect of the present disclosure, the processor may be configured to set the second predetermined value based on the width of the first lane.

In this aspect, the processor sets the second predetermined value based on the width of the first lane, assuming that the width of the second lane is equal to the width of the first lane. For example, the second predetermined value is set to a value equal to the width of the first lane or a value slightly larger than the width of the first lane (the value obtained by adding a predetermined margin to the width of the first lane). This increases the possibility that the alarm target area is set such that the second long side is located within the second lane.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Overview

Figure 1:
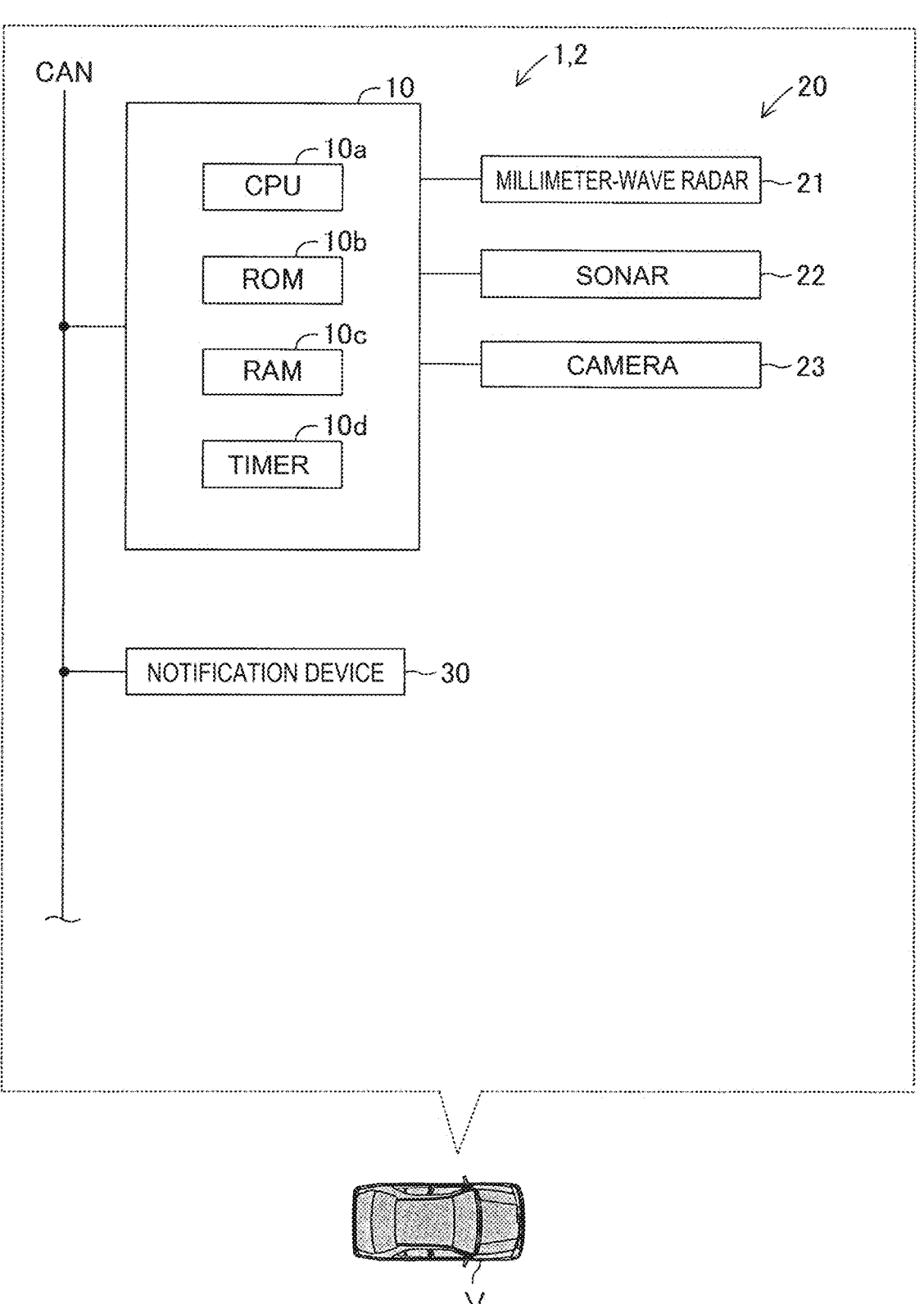
FIG. 1 is a block diagram of a driving assistance apparatus according to an embodiment of the present disclosure.

As shown in FIG. 1, a driving assistance apparatus 1 according to a first embodiment of the present disclosure is applied to a vehicle V having an autonomous driving function (hereinbelow, referred to as the "own vehicle"). The driving assistance apparatus 1 has a function (alarm function) of issuing a predetermined alarm when detecting that a three-dimensional object (another vehicle) is present diagonally behind the own vehicle in a state in which the autonomous driving function is disabled (the state in which the driver is performing a driving operation on his/her own initiative).

Specific Configuration

As shown in FIG. 1, the driving assistance apparatus 1 includes an ECU 10, an on-board sensor 20, and a notification device 30.

The ECU 10 includes a microcomputer including a CPU 10*a*, a ROM 10*b* (rewritable nonvolatile memory), a RAM 10*c*, and a timer 10*d*. The CPU 10*a* executes programs (instructions) stored in the ROM 10*b* to implement various functions. The ROM 10*b* and the RAM 10*c* are each an example of a storage medium. The ECU 10 is connected to another ECU via a controller area network (CAN).

The on-board sensor 20 includes a millimeter-wave radar 21, a sonar 22, and a camera 23.

The millimeter-wave radar 21 includes a transmitter-receiver, and a signal processor. The transmitter-receiver emits radio waves in the millimeter wave band (hereinbelow, referred to as the "millimeter waves") diagonally rearward right and diagonally rearward left of the own vehicle and receives the millimeter waves (reflected waves) reflected by a three-dimensional object (such as another vehicle or a pedestrian) located within the emission range. The signal processor recognizes the distance between the own vehicle and the three-dimensional object, the position (direction) of the three-dimensional object relative to the own vehicle, and the like, based on the time from when the transmitter-receiver emits the millimeter waves to when the transmitter-receiver receives the reflected waves, the phase difference between the transmitted millimeter waves and the received reflected waves, and the degree of attenuation of the reflected waves, and provides the recognition result to the ECU 10.

The sonar 22 intermittently emits ultrasonic waves diagonally rearward right and diagonally rearward left of the own vehicle and receives the ultrasonic waves reflected by the three-dimensional object (reflected waves). The sonar 22 recognizes the distance between the own vehicle and the three-dimensional object, the position (direction) of the three-dimensional object relative to the own vehicle, and the like, based on the time from the emission of the ultrasonic waves to the reception of the reflected waves, and provides the recognition result to the ECU 10.

The camera 23 includes an imaging device, and an image analyzing device. The imaging device, for example, incorporates a CCD. The imaging device is installed at a front part of the own vehicle and faces forward of the own vehicle. The imaging device captures an image of a view in front of the vehicle at a predetermined frame rate and obtains image data. The image analyzing device analyzes the image data obtained from the imaging device and recognizes a target present around the own vehicle from the image. For example, the image analyzing device recognizes a lane mark (such as a division line, a curb, or a median strip that separates travel lanes), and provides the recognition result to the ECU 10.

Figure 2A:
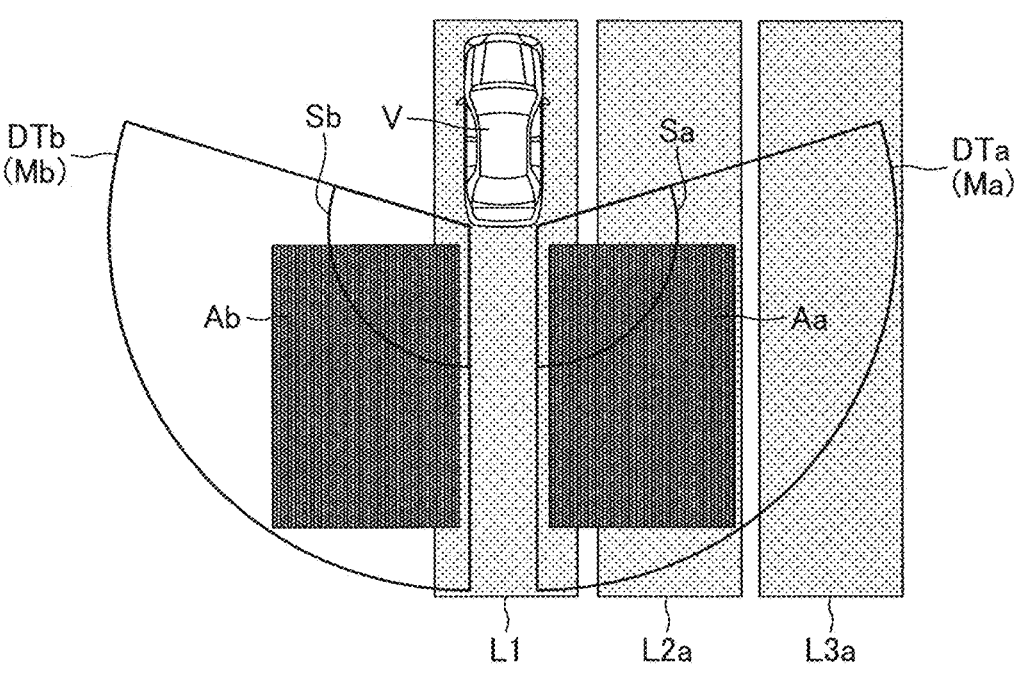
FIG. 2A is a plan view showing a detectable range.
Figure 2B:
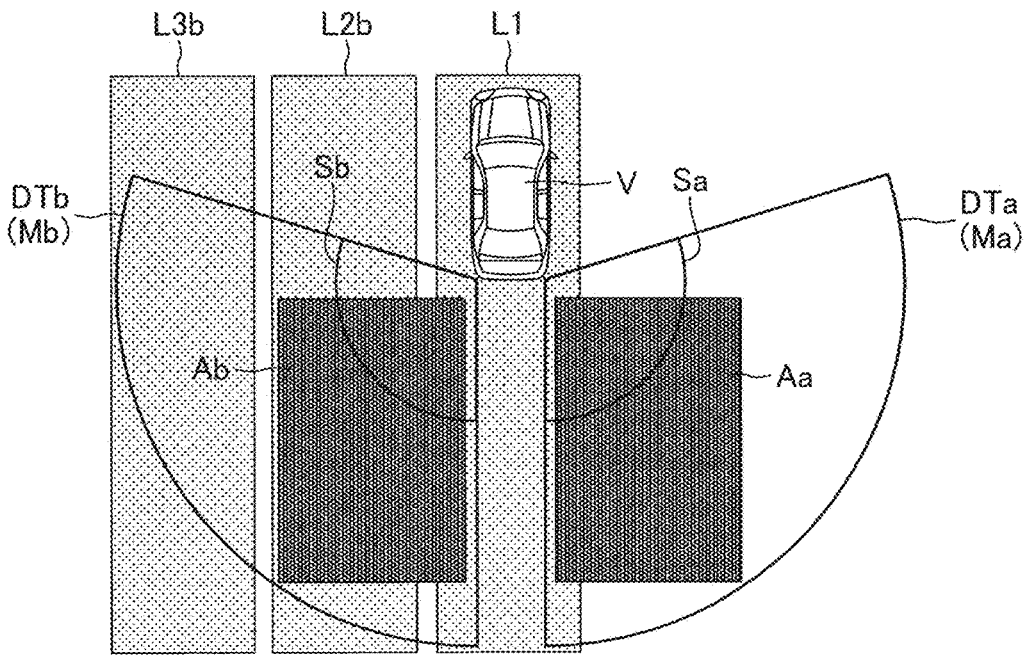
FIG. 2B is a plan view showing the detectable range.

Areas Ma, Mb radiated with the millimeter waves of the millimeter-wave radar 21 (the reachable range of the millimeter waves) have a substantially fan shape in plan view as shown in FIGS. 2A and 2B. The areas Ma, Mb overlap not only travel lanes L2*a*, L2*b* adjacent to a travel lane L1 in which the own vehicle is traveling, but also travel lanes L3*a*, L3*b* adjacent to the travel lanes L2*a*, L2*b*. On the other hand, areas Sa, Sb radiated with the ultrasonic waves of the sonar 22 (the reachable range of the ultrasonic waves) also have a substantially fan shape in plan view. The areas Sa, Sb overlap the areas Ma, Mb. The areas Sa, Sb are narrower than the areas Ma, Mb. The sonar 22 is used to improve the accuracy of detecting a three-dimensional object relatively close to the own vehicle.

The notification device 30 includes an image display device, and a sound device. The image display device displays an image in accordance with an image display command obtained from the ECU 10. The sound device plays a sound in accordance with a sound playback command obtained from the ECU 10.

Alarm Function

The ECU 10 can detect that a three-dimensional object is present diagonally behind the own vehicle based on fused information obtained from the on-board sensor 20. An area (the largest range) for which the ECU 10 can detect a three-dimensional object is referred to as the "detectable areas DTa, DTb". As shown in FIGS. 2A and 2B, the detectable areas DTa, DTb substantially coincide with the areas Ma, Mb. The ECU 10 sets alarm target areas Aa, Ab, which will be described further below, within the detectable areas DTa, DTb, respectively, and controls the notification device 30 such that a predetermined alarm is issued when a three-dimensional object (another vehicle or a pedestrian) is present within the alarm target areas Aa, Ab. Specifically, the ECU 10 causes the notification device 30 to display a predetermined image and play a predetermined sound.

The alarm target areas Aa, Ab have a rectangular shape (band shape) extending in the front-rear direction (longitudinal direction) at positions diagonally rearward right and diagonally rearward left of the own vehicle, respectively, in plan view. That is, the alarm target area Aa corresponds to an area defined by a front side E1*a*, a rear side E2*a*, a left side E3*a*, and a right side E4*a*. The alarm target area Ab corresponds to an area defined by a front side E1*b*, a rear side E2*b*, a right side E3*b*, and a left side E4*b*.

Figures 3A, 3B:
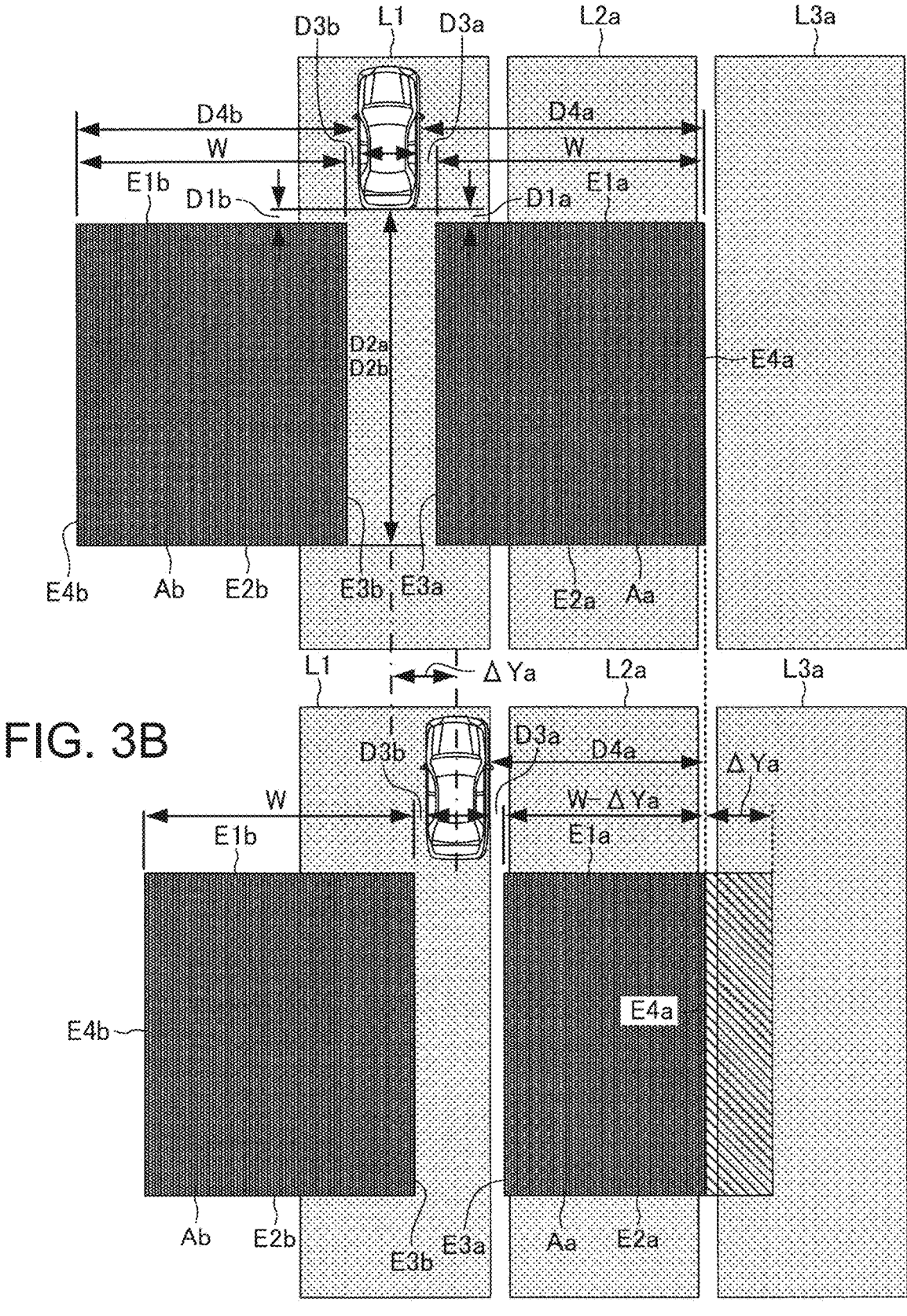
FIG. 3A is a plan view for describing an alarm target area when an own vehicle is displaced to the right from a neutral position.
FIG. 3B is a plan view for describing the alarm target area when the own vehicle is displaced to the right from the neutral position.

As shown in FIG. 3A, the ECU 10 sets a longitudinal distance D1*a* between the rear end of the own vehicle and the front side E1*a* and a longitudinal distance D2*a* between the rear end of the own vehicle and the rear side E2*a* to a predetermined value Δd1 and a predetermined value Δd2, respectively. In addition, the ECU 10 sets a lateral distance D3*a* between the right end (right side face) of the own vehicle and the left side E3*a* to a predetermined value Δd3. The predetermined values Δd1, Δd2, Δd3 are stored in the ROM 10*b*. That is, these values are fixed values. On the other hand, a value assigned to a lateral distance D4*a* between the right end (right side face) of the own vehicle and the right side E4*a* is a variable value. The ECU 10 sets the distance D4*a* as described below.

Specifically, the ECU 10 obtains (calculates) a displacement amount ΔYa of the position of the center of gravity of the own vehicle from the central part of the travel lane L1 in the width direction of the travel lane L1 (hereinbelow, referred to as the "neutral position") to the right based on information obtained from the camera 23 (the position (coordinates) of the lane mark in an image obtained by imaging a view in front of the own vehicle). Next, the ECU 10 obtains a calculated value Δd4 [ΔYa] in accordance with the following formula (1) and sets the distance D4*a* to the calculated value Δd4 [ΔYa].

$$\Delta d4\,[\Delta Ya] = \Delta d3 + W - \Delta Ya \qquad (1)$$

Here, a predetermined width W (fixed value) is, for example, "4 meters" (a value slightly larger than the width of a standard travel lane (3.5 meters)).

In a situation in which the center of gravity of the own vehicle is displaced to the left from the neutral position, the ECU 10 considers the displacement amount ΔYa as "zero". Thus, when the center of gravity of the own vehicle is at the neutral position (and the area on the left side of the neutral position) (ΔYa=0), a width ΔWAa (=D4*a*–D3*a*) of the alarm target area Aa is largest (refer to FIG. 4B). When the center of gravity of the own vehicle is at the neutral position, the right side E4*a* of the alarm target area Aa is located, for example, slightly to the left of the right end of the travel lane L2*a* adjacent to the right side of the travel lane L1 (inside the travel lane L2*a*) (refer to FIG. 3A). As shown in FIG. 3B, when the center of gravity of the own vehicle is displaced to the right from the neutral position, the alarm target area Aa is reduced in its width direction. The difference between the width of the alarm target area Aa before the reduction (when the center of gravity is at the neutral position) and the width of the alarm target area Aa after the reduction is equal to the displacement amount ΔYa. Thus, even when the own vehicle is displaced to the right from the neutral position, the lateral position of the right side E4*a* of the alarm target area Aa relative to the road surface remains unchanged.

In addition, the ECU 10 sets the alarm target area Ab in a procedure similar to the procedure for setting the alarm target area Aa. That is, as shown in FIG. 3B, the ECU 10 sets a distance D1*b* and a distance D2*b* to the predetermined value Δd1 and the predetermined value Δd2, respectively (refer to FIG. 4A). The ECU 10 also sets a distance D3*b* to the predetermined value Δd3. In addition, the ECU 10 obtains a calculated value Δd4 [ΔYb] in accordance with the following formula (2) that is defined using a displacement amount ΔYb of the center of gravity of the own vehicle from the neutral position to the left and sets the distance D4*b* to the calculated value Δd4 [ΔYb].

$$\Delta d4\,[\Delta Yb] = \Delta d3 + W - \Delta Yb \qquad (2)$$

Figures 4A, 4B:
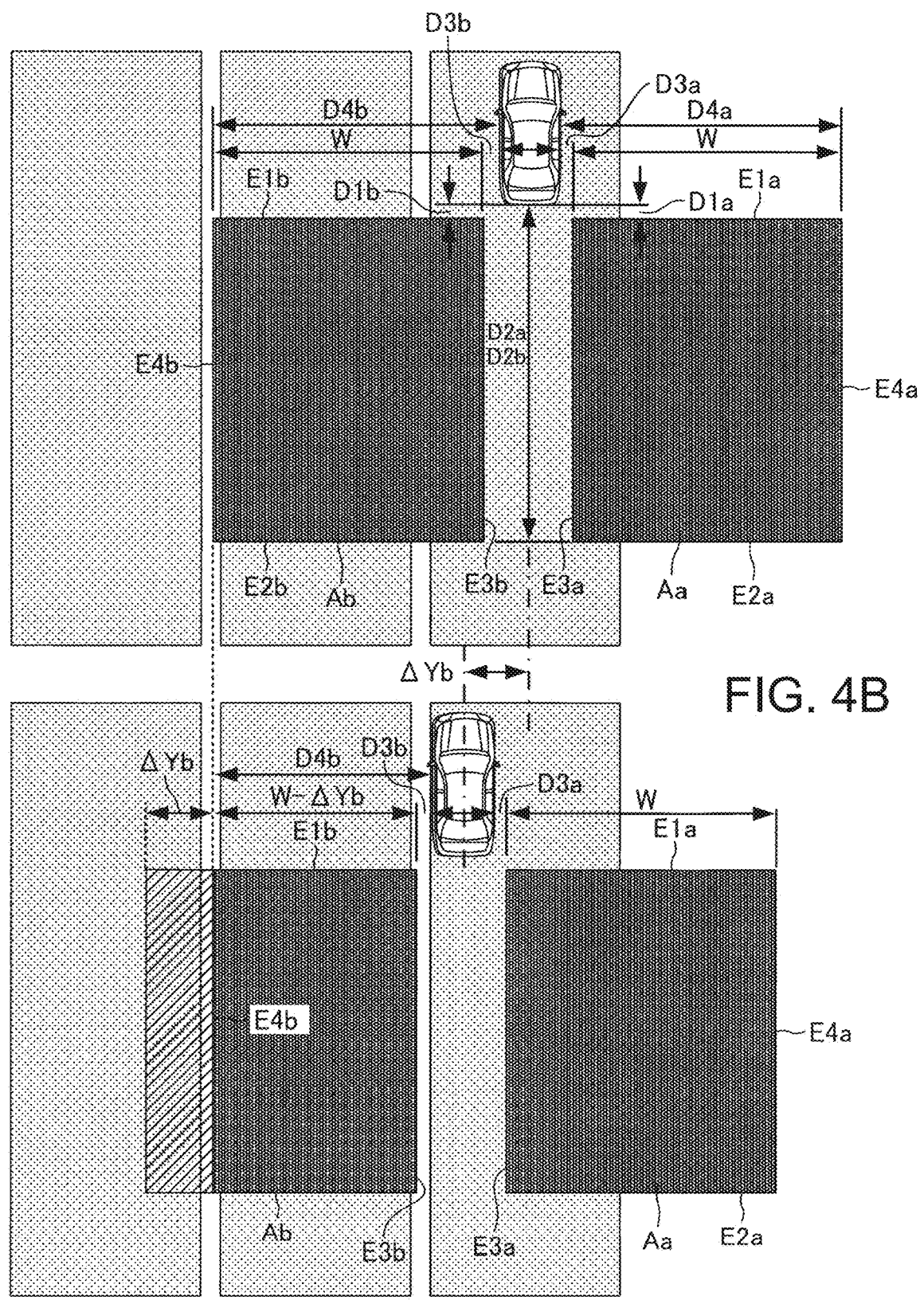
FIG. 4A is a plan view for describing the alarm target area when the own vehicle is displaced to the left from the neutral position.
FIG. 4B is a plan view for describing the alarm target area when the own vehicle is displaced to the left from the neutral position.

In a situation in which the center of gravity of the own vehicle is displaced to the right from the neutral position, the ECU 10 considers the displacement amount ΔYb as "zero". Thus, when the center of gravity of the own vehicle is at the neutral position (and the area on the right side of the neutral position) (ΔYb=0), a width ΔWAb (=D4*b*–D3*b*) of the alarm target area Ab is largest (refer to FIG. 3B). When the center of gravity of the own vehicle is at the neutral position, the left side E4*b* of the alarm target area Ab is located, for example, slightly to the right of the left end of the travel lane L2*b* adjacent to the left side of the travel lane L1 (inside the travel lane L2*b*) (refer to FIG. 4A). As shown in FIG. 4B, when the center of gravity of the own vehicle is displaced to the left from the neutral position, the alarm target area Ab is reduced in its width direction. The difference between the width of the alarm target area Ab before the reduction (when the center of gravity is at the neutral position) and the width of the alarm target area Ab after the reduction is equal to the displacement amount ΔYb. Thus, even when the own vehicle is displaced to the left from the neutral position, the lateral position of the left side E4*b* of the alarm target area Ab relative to the road surface remains unchanged.

Figure 5:
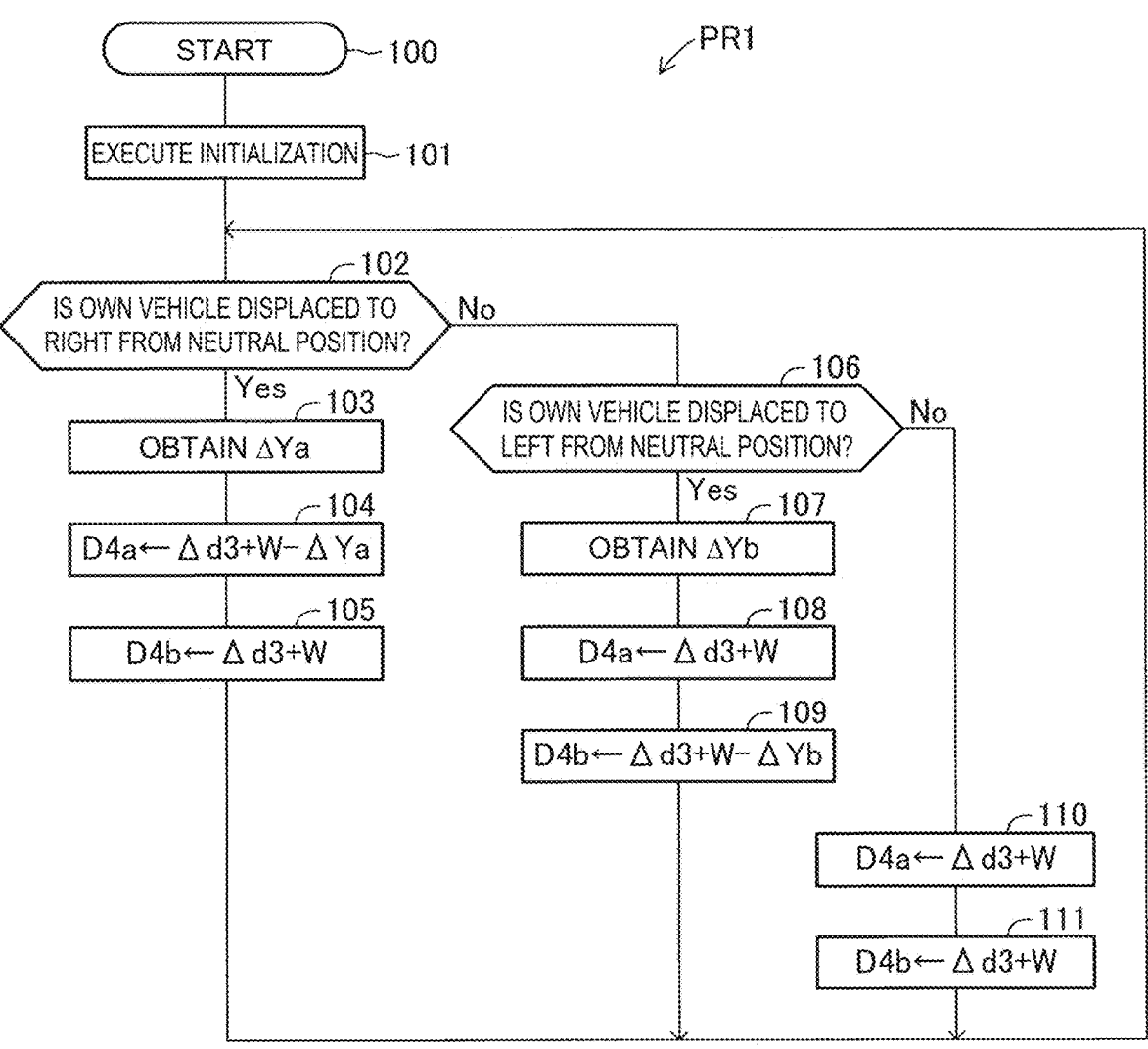
FIG. 5 is a flowchart of a program executed by a CPU to implement a function of setting the alarm target area based on a lateral displacement amount of the own vehicle.

Next, a program PR1 that is executed by the CPU 10*a* (hereinbelow, simply referred to as the "CPU") of the ECU 10 to implement the function of setting the alarm target areas Aa, Ab based on the displacement amounts ΔYa, ΔYb will be described with reference to FIG. 5.

The CPU starts execution of the program PR1 when the alarm function is enabled. The CPU starts execution of the program PR1 from step 100 and advances the process to step 101.

The CPU executes an initialization process in step 101. Specifically, the CPU sets the distances D1*a*, D1*b* to the predetermined value Δd1. The CPU also sets the distances D2*a*, D2*b* to the predetermined value Δd2. The CPU also sets the distances D3*a*, D3*b* to the predetermined value Δd3. Then, the CPU advances the process to step 102.

In step 102, the CPU determines whether the own vehicle (the center of gravity of the own vehicle) is displaced to the right from the neutral position based on information obtained from the camera 23. When the CPU determines that the own vehicle is displaced to the right from the neutral position (102: Yes), the CPU advances the process to step 103. On the other hand, when the CPU determines that the vehicle is not displaced to the right from the neutral position (102: No), the CPU advances the process to step 106.

In step 103, the CPU obtains the displacement amount ΔYa. Then, the CPU advances the process to step 104.

In step 104, the CPU obtains the calculated value Δd4 [ΔYa](=Δd3+W–ΔYa) in accordance with formula (1) and sets the distance D4*a* to the calculated value Δd4 [ΔYa]. Then, the CPU advances the process to step 105.

In step 105, the CPU sets the distance D4*b* to the maximum value. That is, the CPU obtains the calculated value Δd4 [0](=Δd3+W), considering the displacement amount ΔYb in formula (2) as "zero", and sets the distance D4*b* to the calculated value Δd4 [0]. Then, the CPU returns the process to step 102.

In step 106, the CPU determines whether the own vehicle is displaced to the left from the neutral position based on information obtained from the camera 23. When the CPU determines that the own vehicle is displaced to the left from the neutral position (106: Yes), the CPU advances the process to step 107. On the other hand, when the CPU determines that the own vehicle is not displaced to the left from the neutral position (106: No), the CPU advances the process to step 110.

In step 107, the CPU obtains the displacement amount ΔYb. Then, the CPU advances the process to step 108.

In step 108, the CPU sets the distance D4*a* to the maximum value. That is, the CPU obtains the calculated value Δd4 [0](=Δd3+W), considering the displacement amount ΔYa in formula (1) as "zero", and sets the distance D4*a* to the calculated value Δd4 [0]. Then, the CPU advances the process to step 109.

In step 109, the CPU obtains the calculated value Δd4 [ΔYb](=Δd3+W–ΔYb) in accordance with formula (2) and sets the distance D4$b$ to the calculated value Δd4 [Yb]. Then, the CPU returns the process to step 102.

In step 110, the CPU sets the distance D4$a$ to the maximum value. That is, the CPU obtains the calculated value Δd4 [0](=Δd3+W), considering the displacement amount ΔYa in formula (1) as "zero", and sets the distance D4$a$ to the calculated value Δd4 [0]. Then, the CPU advances the process to step 111.

In step 111, the CPU sets the distance D4$b$ to the maximum value. That is, the CPU obtains the calculated value Δd4 [0](=Δd3+W), considering the displacement amount ΔYb in formula (2) as "zero", and sets the distance D4$b$ to the calculated value Δd4 [0]. Then, the CPU returns the process to step 102.

Effects

In the driving assistance apparatus 1, when the center of gravity of the own vehicle is displaced to the right (left) from the neutral position in the travel lane L1, while the lateral distance D3$a$ (D3$b$) between the right side part (left side part) of the own vehicle and the left side E3$a$ (right side E3$b$) is maintained constant, the distance D4$a$ (D4$b$) between the right side part (left side part) of the own vehicle and the right side E4$a$ (left side E4$b$) is shortened. That is, the width ΔWAa (ΔWAb) of the alarm target area Aa (Ab) is reduced. Thus, when the own vehicle is displaced to the right (left) from the neutral position, protrusion of the alarm target area Aa (Ab) toward the travel lane L3$a$ (L3$b$) (or increase in the amount of protrusion) is restrained. As a result, issuance of originally unnecessary alarms is reduced.

Second Embodiment

Configuration

Next, a driving assistance apparatus 2 according to a second embodiment of the present disclosure will be described. The configuration of the driving assistance apparatus 2 is the same as that of the driving assistance apparatus 1.

Alarm Function

Figures 6A, 6B:
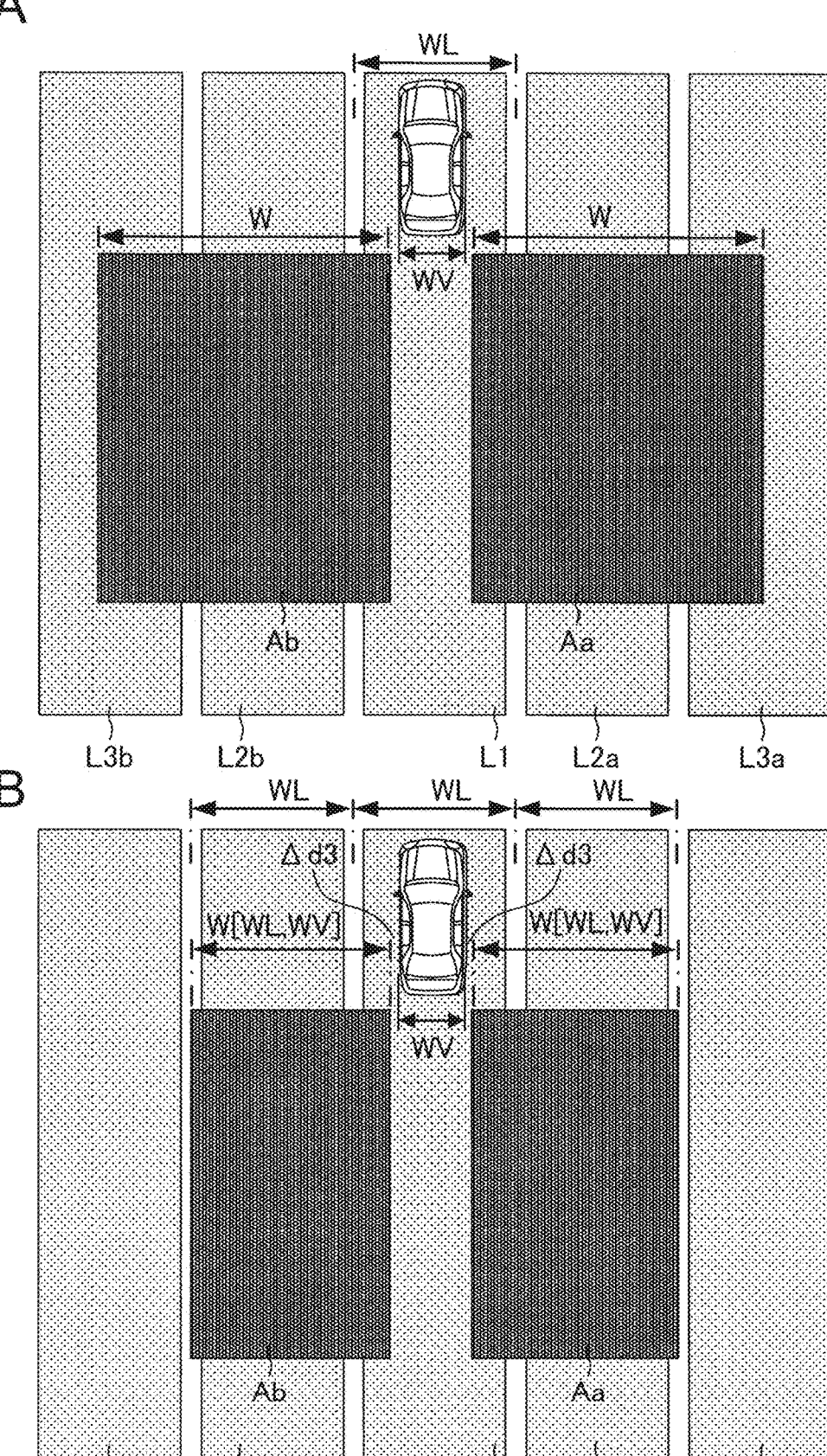
FIG. 6A is a plan view for describing the difference between the maximum value of the width of the alarm target area in the driving assistance apparatus of the first embodiment of the present disclosure and the maximum value of the width of an alarm target area in a driving assistance apparatus of a second embodiment.
FIG. 6B is a plan view for describing the difference between the maximum value of the width of the alarm target area in the driving assistance apparatus of the first embodiment of the present disclosure and the maximum value of the width of the alarm target area in the driving assistance apparatus of a second embodiment.

In the driving assistance apparatus 1, the ECU 10 uses the value obtained by subtracting the displacement amount ΔYa from the value obtained by adding the predetermined width W to the predetermined value Δd3 as the distance D4$a$ (D4$b$) regardless of the width of the travel lane. As shown in FIG. 6A, when the width WL of the travel lane is relatively narrower than the predetermined value W, the alarm target area Aa (Ab) may protrude toward the travel lane L3$a$ (L3$b$). On the other hand, when the width WL of the travel lane is relatively larger than the predetermined value W (the maximum value of the width of the alarm target areas Aa, Ab), a gap (an area for which no alarm is issued even if a vehicle or a pedestrian is present in the area) may be formed between the right side E4$a$ (E4$b$) of the alarm target area Aa (Ab) and the right end (left end) of the travel lane L2$a$ (L2$b$).

Thus, in the driving assistance apparatus 2, the ECU 10 uses a calculated value W [WL, WV] obtained based on the width WL of the travel lane and the vehicle width WV of the own vehicle instead of the predetermined value W as the maximum value of the width of the alarm target areas Aa, Ab (the width of the alarm target areas Aa, Ab when the center of gravity of the own vehicle is at the neutral position). Specifically, the ECU 10 obtains the width WL of the travel lane L1 based on information obtained from the camera 23. The ECU 10 is often unable to accurately obtain the width of the travel lanes L2$a$, L2$b$ based on the information obtained from camera 23. Thus, the ECU 10 uses the width WL of the travel lane L1 as the width of the travel lanes L2$a$, L2$b$. Next, the ECU 10 obtains the calculated value W [WL, WV](=WAa, WAb) in accordance with the following formula (3). The vehicle width WV is stored in advance in the ROM 10$b$.

$$W\ [WL,\ WV] = WL/2 - WV/2 - \Delta d3 + WL \qquad (3)$$

Next, the ECU 10 obtains a calculated value Δd4 [ΔYa] and a calculated value Δd4 [ΔYb] by applying the calculated value W [WL, WV] (the value obtained by formula (3)) to the following formula (4) and formula (5), which are similar to formula (1) and formula (2) of the first embodiment. Then, the ECU 10 sets the distance D4$a$ and the distance D4$b$ to the calculated value Δd4 [ΔYa] and the calculated value Δd4 [ΔYb], respectively.

$$\Delta d4\ [\Delta Ya] = \Delta d3 + W\ [WL,\ WV] - \Delta Ya \qquad (4)$$

$$\Delta d4\ [\Delta Yb] = \Delta d3 + W\ [WL,\ WV] - \Delta Yb \qquad (5)$$

The distances D1$a$, D1$b$, D2$a$, D2$b$, D3$a$, D3$b$ are set in the same manner as in the first embodiment.

Effects

According to the present embodiment, as shown in FIG. 6B, the right end (left end) of the alarm target area Aa (Ab) can always be aligned with the right end (left end) of the travel lane L2$a$ (L2$b$). That is, it is possible to prevent the alarm target areas Aa, Ab from protruding to the travel lanes L3$a$, L3$b$. Thus, it is possible to prevent unnecessary alarms from being issued.

The present disclosure is not limited to the embodiments described above and can employ various modifications within the scope of the disclosure as described below.

First Modification

In the above embodiments, the millimeter-wave radar 21 and the sonar 22 are used to detect a three-dimensional object located diagonally behind the own vehicle. Instead of or in addition to this, a camera or a LiDAR sensor facing rearward of the own vehicle may be used to detect a three-dimensional object located diagonally behind the own vehicle.

Second Modification

In the above embodiments, the alarm target areas Aa, Ab have a rectangular shape extending in the front-rear direction. When the own vehicle is turning (traveling on a curved road), the alarm target areas Aa, Ab may be curved along the curved road.

What is claimed is:

1. A driving assistance apparatus comprising:

an on-board sensor that obtains information about a target present around an own vehicle; and a processor that controls a notification device such that an alarm is issued when a three-dimensional object is present within an alarm target area having a band shape extending in a front-rear direction at a position diagonally behind the own vehicle, wherein the processor is configured to set a lateral distance between a first long side and the own vehicle to a first predetermined value, the first long side being a long side of the alarm target area and located on the own vehicle side, and set a lateral distance between a second long side and the own vehicle to a second predetermined value, the second long side being a long side of the alarm target area and located on an opposite side of the own vehicle, when the own vehicle is traveling in a central part of a first lane in a width direction of the first lane, set the lateral distance between the first long side and the own vehicle to the first predetermined value, and set the lateral distance between the second long side and the own vehicle to a value smaller than the second predetermined value, when the own vehicle is displaced toward a second lane adjacent to the first lane from the central part of the first lane in the width direction of the first lane, calculate a third predetermined value based on a width of the first lane and a width of the own vehicle, and set the lateral distance between the first long side and the own vehicle to the third predetermined value, and set the lateral distance between the second long side and the own vehicle to the third predetermined value.

2. The driving assistance apparatus according to claim 1, wherein the processor is configured to obtain a lateral displacement amount when the own vehicle is displaced toward the second lane from the central part of the first lane in the width direction of the first lane, and set the lateral distance between the second long side and the own vehicle to a value obtained by subtracting the lateral displacement amount from the second predetermined value.

3. The driving assistance apparatus according to claim 1, wherein the processor is configured to set the second predetermined value based on a width of the first lane.

4. The driving assistance apparatus according to claim 1, wherein the processor is configured to:

calculate the predetermined value using the following equation:

$$W[WL, WV] = WL/2 - \Delta d3 + WL$$

where W[WL, WV] is the third predetermined value, WL is the width of the first lane, WV is the width of the own vehicle, and $\Delta d3$ is the first predetermined value; and set the lateral distance between the first long side and the own vehicle to a first value using the following equation:

$$\Delta d4[\Delta Ya] = \Delta d3 + W[WL, WV] - \Delta Ya$$

where $\Delta d4[\Delta Ya]$ is the first value, $\Delta d3$ is the first predetermined value, W[WL, WV] is the third predetermined value, and $\Delta Ya$ is a lateral displacement amount of the own vehicle in a first direction; and set the lateral distance between the second long side and the own vehicle to a second value using the following equation:

$$\Delta d4[\Delta Yb] = \Delta d3 + W[WL, WV] - \Delta Yb$$

where $\Delta d4[\Delta Yb]$ is the second value, $\Delta d3$ is the first predetermined value, W[WL, WV] is the third predetermined value, and $\Delta Yb$ is a lateral displacement amount of the own vehicle in a second direction.

5. The driving assistance apparatus according to claim 1, wherein the third predetermined value is calculated as a result of the width of the first lane being less than a threshold value.

6. The driving assistance apparatus according to claim 1, wherein the value smaller than the second predetermined value is based on an end portion of the second lane.

7. The driving assistance apparatus according to claim 1, wherein the alarm target area comprises a curved shape when the own vehicle turns.

8. The driving assistance apparatus according to claim 1, wherein the processor is configured to:

set a longitudinal direction between a first short side and the own vehicle to a fourth predetermined value, the first short side being a short side of the alarm target area; and set the longitudinal direction between the first short side and the own vehicle to the fourth predetermined value, when the own vehicle is displaced towards the second lane within the first lane.

9. A driving assistance method comprising:

obtaining information about a target present around an own vehicle; and controlling a notification device such that an alarm is issued when a three-dimensional object is present within an alarm target area having a band shape extending in a front-rear direction at a position diagonally behind the own vehicle, wherein the controlling is configured to include setting a lateral distance between a first long side and the own vehicle to a first predetermined value, the first long side being a long side of the alarm target area and located on the own vehicle side, and setting a lateral distance between a second long side and the own vehicle to a second predetermined value, the second long side being a long side of the alarm target area and located on an opposite side of the own vehicle, when the own vehicle is traveling in a central part of a first lane in a width direction of the first lane, setting the lateral distance between the first long side and the own vehicle to the first predetermined value, and setting the lateral distance between the second long side and the own vehicle to a value smaller than the second predetermined value, when the own vehicle is displaced toward a second lane adjacent to the first lane from the central part of the first lane in the width direction of the first lane, calculating a third predetermined value based on a width of the first lane and a width of the own vehicle, and setting the lateral distance between the first long side and the own vehicle to the third predetermined value, and setting the lateral distance between the second long side and the own vehicle to the third predetermined value.

10. The driving assistance method according to claim 9, further comprising:

calculating the predetermined value using the following equation:

$$W[WL, WV] = WL/2 - WV/2 - \Delta d3 + WL$$

where W[WL, WV] is the third predetermined value, WL is the width of the first lane, WV is the width of the own vehicle, and $\Delta d3$ is the first predetermined value; and setting the lateral distance between the first long side and the own vehicle to a first value using the following equation:

$$\Delta d4[\Delta Ya] = \Delta d3 + W[WL, WV] - \Delta Ya$$

where $\Delta d4[\Delta Ya]$ is the first value, $\Delta d3$ is the first predetermined value, W[WL, WV] is the third predetermined value, and $\Delta Ya$ is a lateral displacement amount of the own vehicle in a first direction; and setting the lateral distance between the second long side and the own vehicle to a second value using the following equation:

$$\Delta d4[\Delta Yb] = \Delta d3 + W[WL, WV] - \Delta Yb$$

where $\Delta d4[\Delta Yb]$ is the second value, $\Delta d3$ is the first predetermined value, W[WL, WV] is the third predetermined value, and $\Delta Yb$ is a lateral displacement amount of the own vehicle in a second direction.

11. The driving assistance method according to claim 9, wherein the third predetermined value is calculated as a result of the width of the first lane being less than a threshold value.

12. The driving assistance method according to claim 9, wherein the value smaller than the second predetermined value is based on an end portion of the second lane.

13. The driving assistance method according to claim 9, wherein the alarm target area comprises a curved shape when the own vehicle turns.

14. The driving assistance method according to claim 9, further comprising:

setting a longitudinal direction between a first short side and the own vehicle to a fourth predetermined value, the first short side being a short side of the alarm target area; and setting the longitudinal direction between the first short side and the own vehicle to the fourth predetermined value, when the own vehicle is displaced towards the second lane within the first lane.

15. A non-transitory storage medium storing a driving assistance program that causes a computer included in an own vehicle to execute:

obtaining information about a target present around the own vehicle; and controlling a notification device such that an alarm is issued when a three-dimensional object is present within an alarm target area having a band shape extending in a front-rear direction at a position diagonally behind the own vehicle, wherein the controlling is configured to include setting a lateral distance between a first long side and the own vehicle to a first predetermined value, the first long side being a long side of the alarm target area and located on the own vehicle side, and setting a lateral distance between a second long side and the own vehicle to a second predetermined value, the second long side being a long side of the alarm target area and located on an opposite side of the own vehicle, when the own vehicle is traveling in a central part of a first lane in a width direction of the first lane, setting the lateral distance between the first long side and the own vehicle to the first predetermined value, and setting the lateral distance between the second long side and the own vehicle to a value smaller than the second predetermined value, when the own vehicle is displaced toward a second lane adjacent to the first lane from the central part of the first lane in the width direction of the first lane, calculating a third predetermined value based on a width of the first lane and a width of the own vehicle, and setting the lateral distance between the first long side and the own vehicle to the third predetermined value, and set the lateral distance between the second long side and the own vehicle to the third predetermined value.

16. The non-transitory storage medium according to claim 15, wherein the driving assistance program causes the computer included in the own vehicle to execute:

calculating the predetermined value using the following equation:

$$W[WL, WV] = WL/2 - WV/2 - \Delta d3 + WL$$

where W[WL, WV] is the third predetermined value, WL is the width of the first lane, WV is the width of the own vehicle, and $\Delta d3$ is the first predetermined value; and setting the lateral distance between the first long side and the own vehicle to a first value using the following equation:

$$\Delta d4[Ya] = \Delta d3 + W[WL, WV] - \Delta Ya$$

where $\Delta d4[\Delta Ya]$ is the first value, $\Delta d3$ is the first predetermined value, W[WL, WV] is the third predetermined value, and $\Delta Ya$ is a lateral displacement amount of the own vehicle in a first direction; and setting the lateral distance between the second long side and the own vehicle to a second value using the following equation:

$$\Delta d4[\Delta Yb] = \Delta d3 + W[WL, WV] - \Delta Yb$$

where $\Delta d4[\Delta Yb]$ is the second value, $\Delta d3$ is the first predetermined value, W[WL, WV] is the third predetermined value, and $\Delta Yb$ is a lateral displacement amount of the own vehicle in a second direction.

17. The non-transitory storage medium according to claim 15, wherein the third predetermined value is calculated as a result of the width of the first lane being less than a threshold value.

18. The non-transitory storage medium according to claim 15, wherein the value smaller than the second predetermined value is based on an end portion of the second lane.

19. The non-transitory storage medium according to claim 15, wherein the alarm target area comprises a curved shape when the own vehicle turns.

20. The non-transitory storage medium according to claim 15, wherein the driving assistance program causes the computer included in the own vehicle to execute:

setting a longitudinal direction between a first short side and the own vehicle to a fourth predetermined value, the first short side being a short side of the alarm target area; and setting the longitudinal direction between the first short side and the own vehicle to the fourth predetermined value, when the own vehicle is displaced towards the second lane within the first lane.

* * * * *